(12) United States Patent
Takahashi et al.

(10) Patent No.: US 9,787,223 B2
(45) Date of Patent: Oct. 10, 2017

(54) MOTOR CONTROL APPARATUS, IMAGE FORMING APPARATUS, AND MOTOR CONTROL METHOD

(71) Applicants: Yoshihiro Takahashi, Kanagawa (JP); Hiroyuki Iwasaki, Kanagawa (JP)

(72) Inventors: Yoshihiro Takahashi, Kanagawa (JP); Hiroyuki Iwasaki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/794,154

(22) Filed: Jul. 8, 2015

(65) Prior Publication Data

US 2016/0026107 A1 Jan. 28, 2016

(30) Foreign Application Priority Data

Jul. 25, 2014 (JP) ................................. 2014-151367

(51) Int. Cl.
*H02P 1/04* (2006.01)
*H02P 3/08* (2006.01)
*G03G 15/08* (2006.01)

(52) U.S. Cl.
CPC ............ *H02P 1/04* (2013.01); *G03G 15/0877* (2013.01); *H02P 3/08* (2013.01)

(58) Field of Classification Search
CPC .............. H02P 3/08; H02P 1/04; G03G 13/08
See application file for complete search history.

(56) References Cited

U.S. PATENT DOCUMENTS

| 6,037,734 | A | * | 3/2000 | Toyomura | ............... | H02P 23/16 |
| | | | | | | 318/254.2 |
| 6,597,147 | B2 | * | 7/2003 | Li | ............................ | H02P 8/22 |
| | | | | | | 318/696 |
| 7,054,586 | B2 | | 5/2006 | Kuroda | | |
| 7,228,095 | B2 | | 6/2007 | Kuroda | | |
| 7,280,789 | B2 | | 10/2007 | Iwasaki | | |
| 7,558,510 | B2 | | 7/2009 | Iwasaki | | |
| 7,712,318 | B2 | | 5/2010 | Iwasaki | | |
| 7,848,687 | B2 | | 12/2010 | Iwasaki | | |
| 8,004,226 | B2 | * | 8/2011 | Hartman | ............. | H02P 29/0241 |
| | | | | | | 318/474 |

(Continued)

FOREIGN PATENT DOCUMENTS

| JP | H04-073672 | 3/1992 |
| JP | 2007-078753 | 3/2007 |

*Primary Examiner* — Shawki S Ismail
*Assistant Examiner* — Muhammad S Islam
(74) *Attorney, Agent, or Firm* — Harness, Dickey & Pierce, PLC

(57) ABSTRACT

A motor control apparatus controls a start/stop operation of a motor and includes a counting unit that performs a count-up or count-down operation from a predetermined initial value with a lapse of time in response to receiving an operation start instruction for the motor; a signal output unit that outputs a first state signal in response to receiving the operation start instruction, and outputs a second state signal only when a result of the counting by the counting unit falls outside a predetermined range; and a drive unit that outputs an ON signal to the motor in response to receiving the first state signal from the signal output unit, and outputs an OFF signal to the motor in response to receiving the second state signal from the signal output unit.

19 Claims, 3 Drawing Sheets

(56) References Cited

U.S. PATENT DOCUMENTS

| | | |
|---|---|---|
| 8,200,133 B2 | 6/2012 | Iwasaki |
| 8,229,310 B2 | 7/2012 | Iwasaki et al. |
| 8,886,072 B2 | 11/2014 | Iwasaki |
| 2005/0046363 A1* | 3/2005 | Yamamoto ............ H02N 2/142 318/114 |
| 2007/0122125 A1* | 5/2007 | Watanabe ............ H02P 7/2805 388/801 |
| 2008/0056741 A1* | 3/2008 | Iwasaki ............ G03G 15/0178 399/39 |
| 2009/0039820 A1* | 2/2009 | Milano ............ H02P 6/16 318/590 |

\* cited by examiner

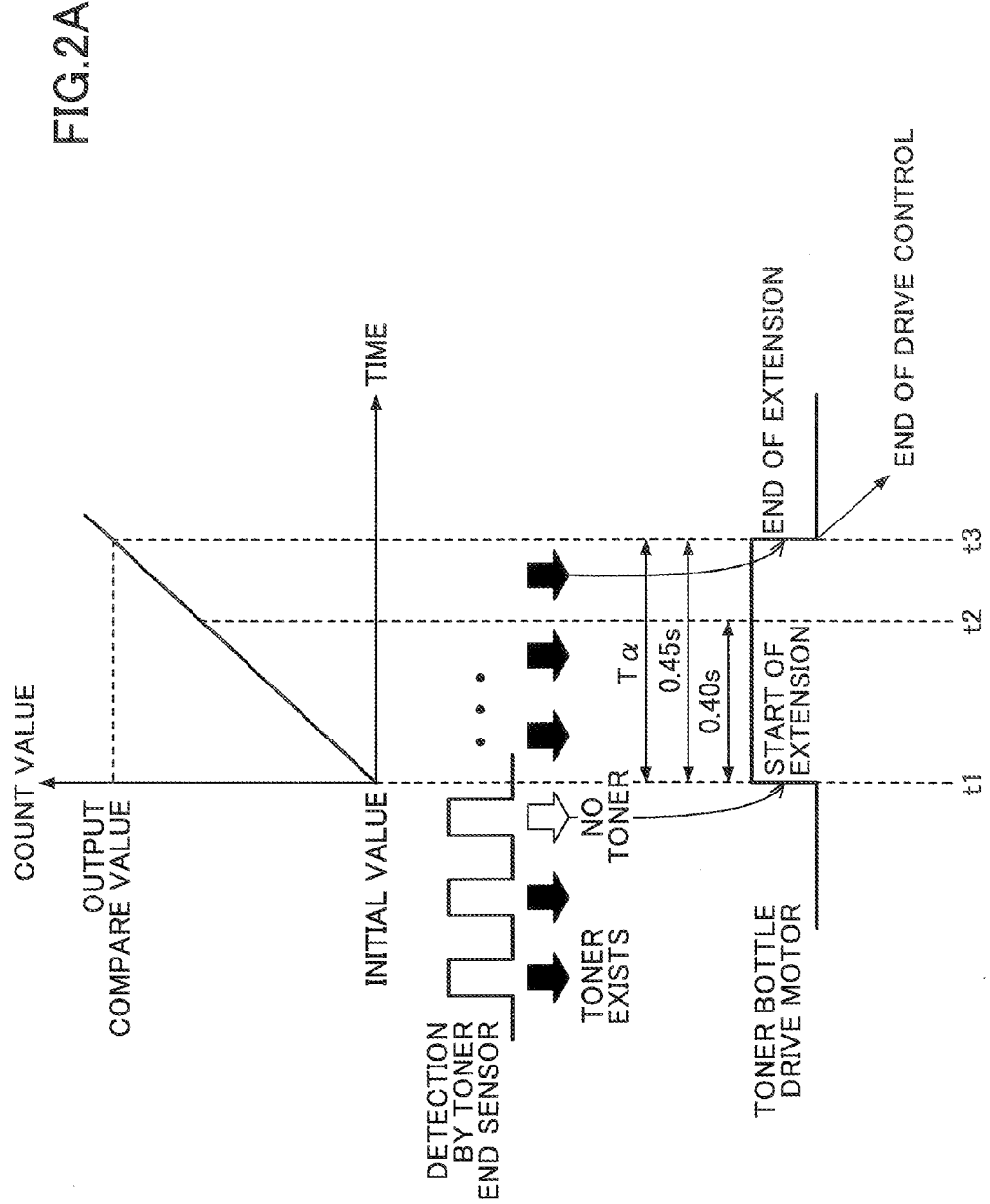

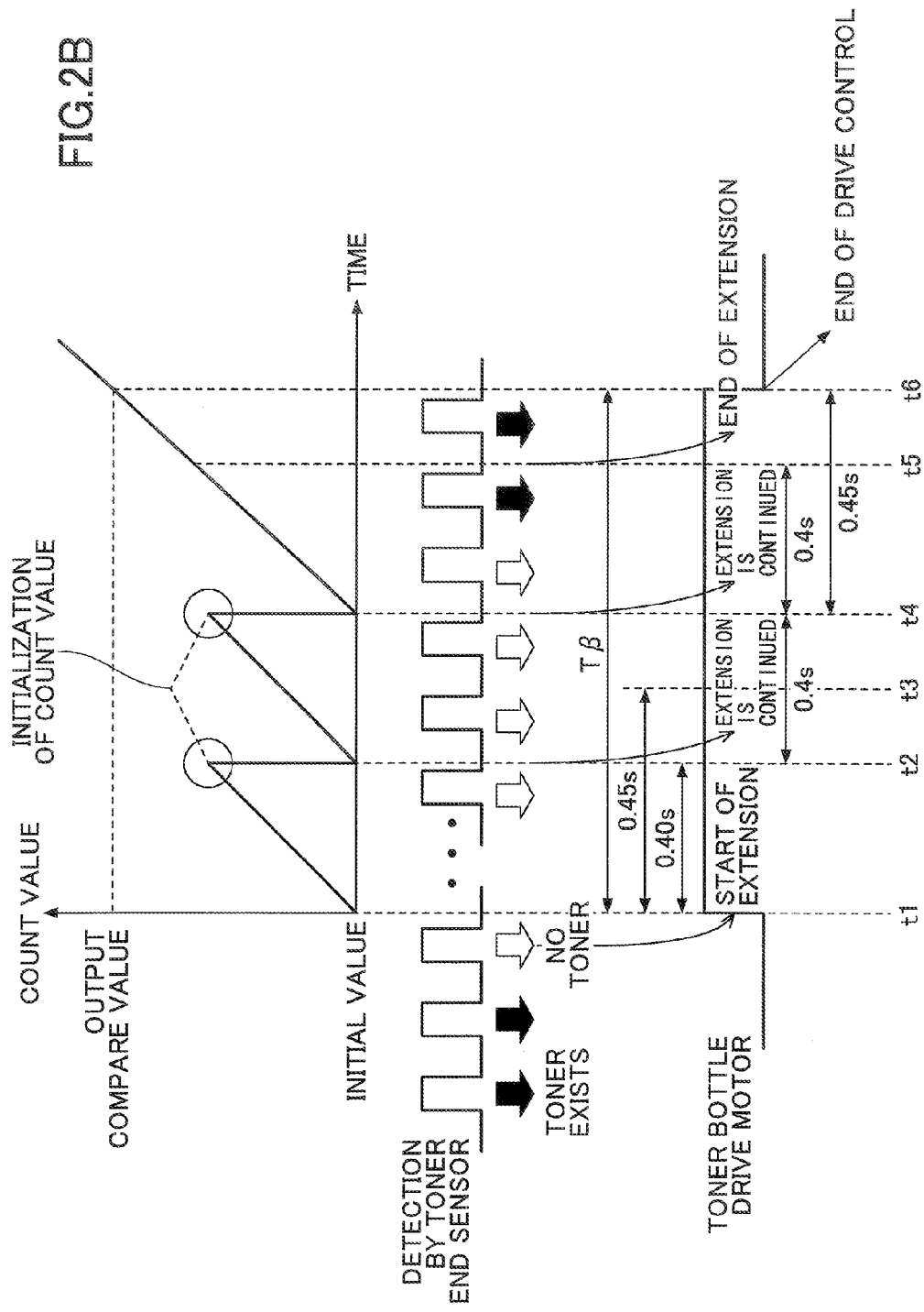

MOTOR CONTROL APPARATUS, IMAGE FORMING APPARATUS, AND MOTOR CONTROL METHOD

BACKGROUND OF THE INVENTION

1. Field of the Invention

The present invention relates to a motor control apparatus, an image forming apparatus, and a motor control method.

2. Description of the Related Art

Conventionally, a method of controlling a start/stop of a toner supply motor in a toner supply system of an image forming apparatus in order to prevent excessive supply of toner or leakage of toner is known.

Specifically, the known method uses software to perform time management of the toner supply motor in the toner supply system of the image forming apparatus, so that excessive supply of toner or leakage of toner due to continuous driving of the toner supply motor is prevented. For example, see Japanese Laid-Open Patent Publication No. 2007-078753.

However, the method according to the related art which performs the time management of the toner supply motor using the software is vulnerable to the excessive supply of toner or the leakage of toner if the operation of the software is out of control.

Moreover, in a case of a tray lifting motor, there is also a problem that the tray lifting motor is subject to overloading if the operation of the software is out of control.

SUMMARY OF THE INVENTION

In one aspect, the present invention provides a motor control apparatus which controls a start/stop operation of a motor in a manner that is impervious to continuous driving of the motor.

In an embodiment which solves or reduces one or more of the above-mentioned problems, the present invention provides a motor control apparatus which controls a start/stop operation of a motor and includes: a counting unit that performs a count-up or count-down operation from a predetermined initial value with a lapse of time in response to receiving an operation start instruction for the motor; a signal output unit that outputs a first state signal in response to receiving the operation start instruction, and outputs a second state signal only when a result of the counting by the counting unit falls outside a predetermined range; and a drive unit that outputs an ON signal to the motor in response to receiving the first state signal from the signal output unit, and outputs an OFF signal to the motor in response to receiving the second state signal from the signal output unit.

Other objects, features and advantages of the present invention will become more apparent from the following detailed description when read in conjunction with the accompanying drawings.

BRIEF DESCRIPTION OF THE DRAWINGS

FIG. 2A is a timing chart for explaining a motor control method in which a drive time extension process is not performed by the motor control apparatus.

FIG. 2B is a timing chart for explaining a motor control method in which a drive time extension process is performed by the motor control apparatus according to the embodiment.

DETAILED DESCRIPTION OF THE PREFERRED EMBODIMENTS

Figure 1:
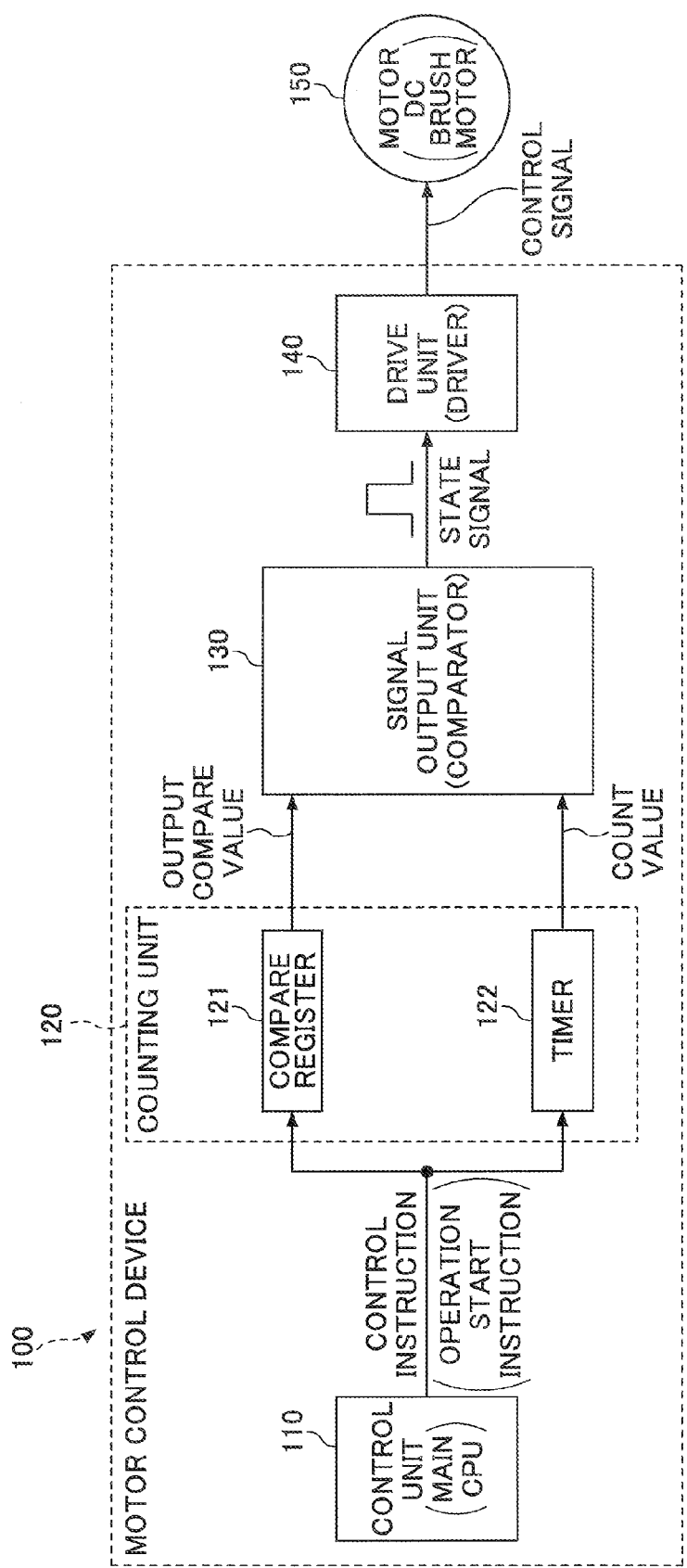
FIG. 1 is a diagram showing a configuration of a motor control apparatus according to an embodiment.

A description will be given of embodiments with reference to the accompanying drawings.

FIG. 1 is a diagram showing a configuration of a motor control apparatus 100 according to an embodiment. As shown in FIG. 1, the motor control apparatus 100 includes a control unit (main CPU) 110, a counting unit 120, a signal output unit (comparator) 130, and a drive unit (driver) 140. The motor control apparatus 100 controls a start/stop operation of a motor 150. An example of the motor 150 may be a toner bottle drive motor or a DC (direct current) brush motor of a toner supply system of an image forming apparatus. The image forming apparatus may include an image formation unit that forms an image using a toner supply system in which the motor control apparatus 100 is provided. In the following, a case in which the motor control apparatus 100 according to the embodiment is applied to a DC brush motor of a toner supply system of an image forming apparatus will be described. However, the present invention is not limited to this case, and the motor control apparatus 100 may be applied to a tray lifting motor of an image forming apparatus.

The control unit 110 generates a control instruction and outputs the control instruction to the counting unit 120. Examples of the control instruction generated by the control unit 110 include an operation start instruction, a register value setup instruction, a counter clear instruction, etc.

For example, the control unit 110 generates and outputs an operation start instruction to the counting unit 120 in response to a state change from a "toner existing" state to a "no toner" state detected by using a known toner end sensor (not illustrated) to which polling is given by the control unit 110 at intervals of a fixed period. Moreover, the control unit 110 generates and outputs a counter clear instruction to the counting unit 120 when a "no toner" state is detected by the toner end sensor during operation of the motor 150. Note that the control unit 110 may output a motor stop signal, but, in this case, the software load is increased.

The counting unit 120 includes a compare register 121 and a timer 122. The counting unit 120 performs a count-up or count-down operation with a lapse of time from a predetermined initial value in response to receiving an operation start instruction for the motor 150.

The compare register 121 is a hardware unit in which a register value is set up based on a control instruction (e.g., a register value setup instruction) from the control unit 110, and outputs the set-up register value to the signal output unit 130. Examples of the set-up register value include a predetermined output compare value, an operational mode setting value, a timer setting value, etc.

The timer 122 is a hardware unit which starts the count-up (or count-down) operation from the initial value in response to a control instruction (e.g., an operation start instruction or a counter clear instruction) from the control unit 110, and outputs a count value to the signal output unit 130. A free run timer and counter of an input/output control device incorporated in the control unit 110 may be used as the counting unit 120.

The compare register 121 is interlocked with the timer 122, and a start/stop operation of the motor 150 is controlled based on an output value (e.g., an output compare value, or a count value) output by the counting unit 120.

The signal output unit 130 is a hardware unit which outputs to the drive unit 140 a first state signal in response to detecting that an operation start instruction is input to the motor 150, and outputs to the drive unit 140 a second state signal in response to detecting that a count value (the result of the counting) output from the counting unit 120 falls outside a predetermined range between the initial value and the output compare value.

Specifically, the signal output unit 130 compares the output compare value output from the compare register 121 with the count value output from the timer 122 simultaneously with a start of the counting operation by the counting unit 120. The signal output unit 130 outputs to the drive unit 140 the first state signal until the count value incremented from the initial value reaches the output compare value. At the same time the count value reaches the output compare value, the signal output unit 130 outputs the second state signal to the drive unit 140.

A comparator of an input/output control device incorporated in the control unit 110 may be used as the signal output unit 130. Note that the first state signal output by the signal output unit 130 is a signal (ON signal) to start operation of the motor 150, and the second state signal output by the signal output unit 130 is a signal (OFF signal) to terminate operation of the motor 150.

The drive unit 140 outputs a control signal (an ON signal, an OFF signal) to the motor 150 in response to a state signal output from the signal output unit 130. For example, upon detecting that the first state signal is output from the signal output unit 130, the drive unit 140 outputs an ON signal to the motor 150. Upon detecting that the second state signal is output from the signal output unit 130, the drive unit 140 outputs an OFF signal to the motor 150. A switching element such as a field-effect transistor (FET), a DC brush motor driver IC, etc., may be used as the drive unit 140.

The motor 150 starts or stops operation in response to the control signal output from the drive unit 140. For example, upon detecting that the control signal output from the drive unit 140 is an ON signal, the operation of the motor 150 is started. Upon detecting that the control signal output from the drive unit 140 is an OFF signal, the operation of the motor 150 is terminated.

A duration of operation of the motor 150 has a dependence on the output compare value output from the compare register 121. In other words, the longer the time required for the count value (which is incremented from the initial value with a lapse of time) to reach the output compare value, the longer the duration of operation of the motor 150.

Upon detecting a "no toner" state by the toner end sensor during operation of the motor 150, the motor control apparatus 100 starts performing a drive time extension process. In this drive time extension process, the control unit 110 outputs a counter clear instruction to the timer 122 so that the count value of the timer 122 is cleared (or reset to the initial value), and simultaneously the timer 122 starts the count-up or count-down operation from the initial value again to extend the duration of operation of the motor 150. The timer 122 continues to perform the counting operation until the count value reaches the output compare value. The motor 150 is continuously driven while the control signal output from the drive unit 140 to the motor 150 is an ON signal.

In the above-described motor control apparatus 100 according to the embodiment, the respective hardware units are operated based on the control instruction output from the control unit 110, and the start/stop operation of the motor 150 (or the duration of operation of the motor 150) is appropriately controlled. It is possible to provide a motor control apparatus which is impervious to continuous driving of the motor. Even when the operation of the software is out of order, the motor control apparatus 100 operates the hardware units normally and stops the operation of the motor 150 at appropriate points in time, and it is possible to prevent the motor 150 from being overloaded. Applying the motor control apparatus 100 that is impervious to continuous driving of the motor to the toner supply system of the image forming apparatus enables the prevention of the excessive supply of toner or the leakage of toner due to continuous driving of the motor.

A motor control method performed by the motor control apparatus 100 according to the embodiment will be described. FIG. 2A is a timing chart for explaining a motor control method in which a drive time extension process is not performed by the motor control apparatus 100. FIG. 2B is a timing chart for explaining a motor control method in which a drive time extension process is performed by the motor control apparatus 100.

Note that the motor control apparatus 100 according to the embodiment controls a drive time (a duration of operation) of the motor by using a state change (e.g., a state change from a "no toner" state to a "toner existing" state) detected by the toner end sensor as a trigger of the control.

First, the motor control method in which the drive time extension process is not performed by the motor control apparatus 100 is explained with reference to FIG. 2A. As shown in FIG. 2A, at a time t1 (which is an instant at which a state change from a "toner existing" state to a "no toner" state is detected by the toner end sensor), the control unit 110 outputs an operation start instruction to the counting unit 120 to start operation of the motor 150 via the drive unit 140 (a start of the motor operation). At the same time, the timer 122 starts performing a count-up (or count-down) operation from the initial value with a lapse of time. The signal output unit 130 outputs the first state signal (ON signal) to the drive unit 140.

During a period from the time t1 to a time t2, the control unit 110 continues to perform the operation of the motor 150. The timer 122 continues to perform the count-up operation.

At the time t2 (which is an instant at which a predetermined period (e.g., 0.40 seconds) has elapsed after the start of the motor operation), if a "toner existing" state is detected by the toner end sensor, then the control unit 110 determines that the drive time extension process is to be terminated (an end of the motor operation). At this time, the timer 122 continues to perform the count-up operation.

During a period from the time t2 to a time t3, the control unit 110 continues to perform the motor operation. The timer 122 continues to perform the count-up operation.

At the time t3 (which is an instant at which the count value of the timer 122 reaches the output compare value), the control unit 110 terminates the motor operation (an end of the motor operation). At the same time, the timer 122 terminates the count-up operation and the counting unit 120 outputs the second state signal (an OFF signal) to the drive unit 140.

A drive time Tα of the motor in the example of FIG. 2A is a duration (e.g., 0.45 seconds) between the time t1 and the time t3 which is needed for the count value of the timer incremented from the initial value to reach a predetermined value (the output compare value).

Next, the motor control method in which the drive time extension process is performed by the motor control apparatus 100 according to the embodiment is explained with reference to FIG. 2B. As shown in FIG. 2B, at a time t1 (which is an instant at which a state change from a "toner existing" state to a "no toner" state is detected by the toner end sensor), the control unit 110 outputs an operation start instruction to each of the compare register 121 and the timer 122 to start operation of the motor 150 via the drive unit 140 (a start of the motor operation). At the same time, the timer 122 starts performing the count-up operation from the initial value with a lapse of time. The signal output unit 130 outputs the first state signal (ON signal) to the drive unit 140.

During a period from the time t1 to a time t2, the control unit 110 continues to perform the motor operation. The timer 122 continues to perform the count-up operation.

At the time t2 (which is an instant at which the predetermined period (e.g., 0.40 seconds) has elapsed after the start of the motor operation), if a "no toner" state is detected by the toner end sensor, then the control unit 110 outputs a counter clear instruction to the timer 122 and determines that the drive time extension process is to be performed (the motor operation is continued and extended). The timer 122 stops performing the count-up operation, initializes the count value to the initial value (first initialization), and restarts performing the count-up operation from the initial value.

During a period from the time t2 to a time t3, the control unit 110 continues to perform the motor operation. The timer 122 continues to perform the count-up operation.

At the time t3 (which is, in the example of FIG. 2A, an instant at which the motor operation is terminated), the control unit 110 in the example of FIG. 2B continues to perform the motor operation. Note that the count value of the timer 122 is already initialized to the initial value at the time t2 in the example of FIG. 2B, and the count value at the time t3 in the example of FIG. 2B is smaller than the count value at the time t3 in the example of FIG. 2A.

At a time t4 (which is an instant at which the predetermined period (e.g., 0.40 seconds) has elapsed after the first initialization), if a "no toner" state is detected by the toner end sensor, then the control unit 110 outputs a counter clear instruction to the timer 122 again and determines that the drive time extension process is to be performed. The timer 122 terminates the count-up operation, initializes the count value to the initial value (second initialization), and restarts performing the count-up operation from the initial value.

During a period from the time t4 to a time t5, the control unit 110 continues to perform the motor operation and the timer 122 continues to perform the count-up operation.

At the time t5 (which is an instant at which the predetermined period (e.g., 0.40 seconds) has elapsed after the second initialization), if a "toner existing" state is detected by the toner end sensor, then the control unit 110 determines that the drive time extension process is to be terminated. The timer 122 continues to perform the count-up operation.

During a period from the time t5 to a time t6, the control unit 110 continues to perform the motor operation and the timer 122 continues to perform the count-up operation.

At the time t6 (which is an instant at which the count value of the timer 122 reaches the output compare value), the control unit 110 terminates the motor operation (an end of the motor operation). At the same time, the timer 122 terminates the count-up operation and the counting unit 120 outputs the second state signal (an OFF signal) to the drive unit 140.

A drive time Tβ of the motor in the example of FIG. 2B is a duration (e.g., 1.25 seconds) between the time t1 and the time t6, which is a sum of a duration (e.g., 0.80 seconds) needed from the start of the motor operation to the second initialization and a duration (e.g., 0.45 seconds) needed for the count value of the timer incremented from the initial value after the second initialization to reach the predetermined value (the output compare value).

Note that initialization of the count value may be performed in response to the counter clear instruction output from the control unit 110, or may be performed by rewriting the register value (the output compare value) of the compare register 121 in response to another control instruction output from the control unit 110 in the midst of the drive time extension process.

In the above-described motor control method according to the embodiment, when a "no toner" state is detected by the toner end sensor during operation of the motor, the operation of the motor can be continued, and when a "toner existing" state is detected by the toner end sensor, the operation of the motor can be stopped. Using a hardware timer, the timing of a start/stop of the motor operation can be appropriately controlled, and it is possible to provide a motor control apparatus which is impervious to continuous driving of the motor.

The motor control apparatus and method according to the present invention are not limited to the specifically disclosed embodiments, and variations and modifications may be made without departing from the scope of the present invention.

The present application is based upon and claims the benefit of priority of Japanese Patent Application No. 2014-151367, filed on Jul. 25, 2014, the contents of which are incorporated herein by reference in their entirety.

What is claimed is:

1. A motor control apparatus configured to control a drive and stop operation of a motor, comprising:
    a counting unit configured to count-up or count-down a count value of a timer from an initial value with a lapse of time in response to receiving an operation start instruction;
    a signal output unit configured to compare an output compare value with the count value of the timer simultaneously with a start of the counting by the counting unit, output a first state signal until the count value reaches the output compare value, and output a second state signal simultaneously when the count value reaches the output compare value;
    a drive unit configured to output to the motor a first control signal to drive the motor in response to receiving the first state signal from the signal output unit, and output to the motor a second control signal to stop the motor in response to receiving the second state signal from the signal output unit; and
    a control unit configured to
        perform a drive time extension process to reset the count value to the initial value in response to a determination that the count value has reached a first threshold value that is smaller than the output compare value, and that a state of an output signal from a sensor is a first state, and
        terminate the drive time extension process in response to a determination that the count value has reached the first threshold value and that the state of the output signal from the sensor has changed from the first state to a second state.

2. The motor control apparatus according to claim 1, wherein the control unit is further configured to
    output a control instruction to the counting unit, and
    output a counter clear instruction to the counting unit.

3. The motor control apparatus according to claim 1, wherein the drive unit is a field-effect transistor.

4. The motor control apparatus according to claim 1, wherein the drive unit is a DC brush motor driver integrated circuit (IC).

5. An image forming system, comprising:
a toner system including a motor control apparatus according to claim 1; and
an image formation unit configured to form an image using the toner system.

6. The motor control apparatus according to claim 2, wherein the control unit includes a free run timer and a counter of an input/output control device.

7. The motor control apparatus according to claim 2, wherein the control unit includes a comparator of an input/output control device.

8. A motor control method for use in a motor control apparatus which controls a drive and stop operation of a motor, the method comprising:
performing, by a counting unit, a count-up or count-down operation of a timer from an initial value with a lapse of time in response to receiving an operation start instruction;
comparing, by a signal output unit, an output compare value with a count value of the timer simultaneously with a start of the counting by the counting unit;
outputting, by the signal output unit, a first state signal until the count value reaches the output compare value;
outputting, by the signal output unit, a second state signal simultaneously when the count value reaches the output compare value;
outputting, by a drive unit, to the motor a first control signal to drive the motor in response to receiving the first state signal from the signal output unit;
outputting, by the drive unit, to the motor a second control signal to stop the motor in response to receiving the second state signal from the signal output unit;
performing, by a control unit, a drive time extension process to reset the count value to the initial value in response to a determination that the count value has reached a first threshold value that is smaller than the output compare value, and that a state of an output signal from a sensor is a first state; and
terminating, by the control unit, the drive time extension process in response to a determination that the count value has reached the first threshold value and that the state of the output signal from the sensor has changed from the first state to a second state.

9. The method of claim 8, further comprising:
outputting, by the counting unit, at least one of the output compare value and the count value to the signal output unit.

10. The method of claim 8, further comprising:
outputting, by the control unit, a start operation instruction to the counting unit.

11. The method of claim 9, wherein the outputting by the counting unit is based on a start operation instruction.

12. An apparatus for controlling an operation of a motor, comprising:
a memory having a first set of computer readable instructions stored thereon; and
at least one processor configured to execute the first set of computer readable instructions to,
output a first operation instruction to a controller based on a determination that a state of an output signal from a sensor changes from a first state to a second state, the second state corresponding to the apparatus having no toner, the first operation instruction corresponding to incrementing of a timer in the controller from an initial value and a driving of the motor,
output a second operation instruction to the controller if the state of the output signal from the sensor changes from the second state to the first state, the first state corresponding to the apparatus having toner, the second operation instruction corresponding to continuing incrementing of the timer and stopping the driving of the motor,
perform a drive time extension process to reset a count value of the timer to an initial value in response to a determination that the count value has reached a first threshold value that is smaller than an output compare value, and that the state of the output signal from the sensor is the second state, and
terminate the drive time extension process to reset the count value to the initial value in response to a determination that the count value has reached the first threshold value and that the state of the output signal from the sensor has changed from the second state to the first state.

13. The apparatus of claim 12, wherein the at least one processor is further configured to execute the first set of computer readable instructions to,
output a third operation instruction if a value of the timer equals a threshold value, the third operation corresponds to stopping the incrementing of the timer and stopping the driving of the motor.

14. The apparatus of claim 12, wherein the controller includes a compare register and the timer, the controller is configured to execute a second set of computer readable instructions to,
output a register value from the compare register to a signal comparator, and
output a count value from the timer to the signal comparator.

15. The apparatus of claim 13, wherein the controller is configured to execute a second set of computer readable instructions to,
output a first control signal to a driver based on the first operation instruction, and
output a second control signal to the driver based on the third operation instruction, the second control signal is different from the first control signal.

16. The apparatus of claim 14, wherein the compare register and the timer are interlocked with each other.

17. The apparatus of claim 14, wherein
the register value includes at least one of an output compare value, an operational mode setting value, and a timer setting value, the output compare value corresponds to a driving time of the motor, and
the count value corresponds to a numerical value of the timer.

18. The apparatus of claim 14, wherein the driving of the motor is based on at least one of the register value and the count value.

19. The apparatus of claim 17, wherein the signal comparator is configured to execute a third set of computer readable instructions to,
output a first state signal to a driver until the count value equals the output compare value.

* * * * *